US009246296B2

(12) United States Patent
Clowes et al.

(10) Patent No.: US 9,246,296 B2
(45) Date of Patent: Jan. 26, 2016

(54) LASER OR AMPLIFIER OPTICAL DEVICE SEEDED WITH NONLINEARLY GENERATED LIGHT

(71) Applicant: Fianium Ltd., Hamble, Southampton (GB)

(72) Inventors: John Redvers Clowes, New Milton (GB); Michael Yarrow, Fareham (GB)

(73) Assignee: Fianium Ltd, Southampton (GB)

( * ) Notice: Subject to any disclaimer, the term of this patent is extended or adjusted under 35 U.S.C. 154(b) by 0 days.

(21) Appl. No.: 14/531,555

(22) Filed: Nov. 3, 2014

(65) Prior Publication Data

US 2015/0055962 A1 Feb. 26, 2015

Related U.S. Application Data

(62) Division of application No. 13/665,093, filed on Oct. 31, 2012, now Pat. No. 8,902,495.

(60) Provisional application No. 61/554,460, filed on Nov. 1, 2011.

(30) Foreign Application Priority Data

Feb. 3, 2012 (GB) .................................. 1201902.2

(51) Int. Cl.
*H01S 3/00* (2006.01)
*H01S 3/23* (2006.01)
(Continued)

(52) U.S. Cl.
CPC ............ *H01S 3/0092* (2013.01); *G02F 1/3536* (2013.01); *H01S 3/067* (2013.01);
(Continued)

(58) Field of Classification Search
CPC .............................. H01S 3/2308; H01S 5/5054
See application file for complete search history.

(56) References Cited

U.S. PATENT DOCUMENTS 5,090,795 A * 2/1992 O'Meara et al. ............... 359/240
5,798,853 A * 8/1998 Watanabe ..................... 398/150
(Continued)

FOREIGN PATENT DOCUMENTS

DE       10322110 A1  12/2004
EP        1734403 A2  12/2006
(Continued)

OTHER PUBLICATIONS

K V Ergakov and V V Yarovoi, Energy optimisation of an Nd:YAG-based four-wave-mixing oscillator with feedback and investigation of its adaptive properties in the pulse-periodic regime, Quantum Electronics, vol. 26, No. 5, p. 389 http://stacks.iop.org/1063-7818/26/i=5/a=A05.*
(Continued)

*Primary Examiner* — Ari M Diacou
(74) *Attorney, Agent, or Firm* — Peter Rainville

(57) ABSTRACT

An optical apparatus comprising an optical source for providing output light for providing input signal light can comprise a pump source for pumping a four wave mixing (FWM) process with light pulses ("FWM pump light"); a FWM element in optical communication with said pump source, said FWM element configured for hosting the FWM process to generate, responsive to the FWM pump light, pulses of FWM signal light and FWM idler light having different wavelengths; and a laser or amplifier optical device comprising a gain material for providing optical gain at a gain wavelength via a process of stimulated emission responsive to optical pumping with pump light, said laser or amplifier optical device in optical communication with said optical source and receiving one of the FWM signal light and the FWM idler light as input signal light having the gain wavelength for optically seeding with input signal light the laser or amplifier optical device.

26 Claims, 9 Drawing Sheets

(51) Int. Cl.
G02F 1/35 (2006.01)
H01S 3/16 (2006.01)
H01S 3/067 (2006.01)
H01S 3/094 (2006.01)
H01S 3/0941 (2006.01)
H04B 10/50 (2013.01)

(52) U.S. Cl.
CPC ........... *H01S3/06758* (2013.01); *H01S 3/2308* (2013.01); *H01S 3/0064* (2013.01); *H01S 3/0078* (2013.01); *H01S 3/06741* (2013.01); *H01S 3/09415* (2013.01); *H01S 3/094007* (2013.01); *H01S 3/094069* (2013.01); *H01S 3/161* (2013.01); *H01S 3/1603* (2013.01); *H01S 3/1608* (2013.01); *H01S 3/1611* (2013.01); *H01S 3/1616* (2013.01); *H01S 3/1618* (2013.01); *H01S 3/2391* (2013.01); *H04B 10/503* (2013.01)

(56) References Cited

U.S. PATENT DOCUMENTS

| | | | |
|---|---|---|---|
| 6,522,818 | B1* | 2/2003 | Aso et al. ................. 385/122 |
| 8,761,210 | B1* | 6/2014 | Henry et al. .................. 372/3 |
| 8,797,639 | B2* | 8/2014 | McKinstrie ................ 359/330 |
| 2003/0016437 | A1 | 1/2003 | Islam et al. |
| 2004/0135079 | A1 | 7/2004 | Moellmann |
| 2005/0105865 | A1 | 5/2005 | Fermann et al. |
| 2006/0104582 | A1* | 5/2006 | Frampton et al. ........... 385/123 |
| 2008/0059135 | A1 | 3/2008 | Murugkar et al. |
| 2008/0261382 | A1* | 10/2008 | Starodoumov et al. ....... 438/463 |
| 2008/0267241 | A1* | 10/2008 | Brown et al. ................. 372/55 |
| 2009/0141340 | A1 | 6/2009 | Sharping et al. |
| 2009/0238222 | A1* | 9/2009 | Dantus et al. ................ 372/22 |
| 2010/0176307 | A1 | 7/2010 | Hell et al. |
| 2011/0064096 | A1 | 3/2011 | Shah et al. |
| 2012/0300287 | A1* | 11/2012 | Starodoumov et al. ....... 359/329 |
| 2013/0301663 | A1* | 11/2013 | Clowes et al. ................... 372/6 |

FOREIGN PATENT DOCUMENTS

| | | |
|---|---|---|
| JP | 11142901 A | 5/1999 |
| JP | 2004139064 A | 5/2004 |
| WO | WO2005/062113 A1 | 7/2005 |
| WO | WO2007/127356 A2 | 11/2007 |
| WO | WO2009024529 | 2/2009 |
| WO | 2011089441 A1 | 7/2011 |
| WO | 2011157284 A1 | 12/2011 |

OTHER PUBLICATIONS

International Search Report from GB1201902.2 (1 page).
Kunimasa Saitoh and Masanori Koshiba, "Empirical relations for simple design of photonic crystal fibers," Optics Express, Jan. 10, 2005, vol. 13, No. 1, pp. 267-274.
W.J. Wadsworth, et al., "Supercontinuum and four-wave mixing with Q-switched pulses in endlessly single-mode photonic crystal fibres," Optics Express, Jan. 26, 2004, vol. 12, No. 2, pp. 299-309.
JP11142901A EPODOC.
J. Fan et al., "An experimental study of parametric amplification," Lasers and Electro-Optics, 2006 and 2006 Quantum Electronics and Laser Science Conference. CLEO/QELS 2006. Conference on, pp. 1-2, May 21-26, 2006.
F. Gerome et al., "High Power Tunable Femtosecond Soliton Source Using Hollow-Core Photonic Bandgap Fiber, and its use for Frequency Doubling," Optics Express, vol. 16, No. 4, pp. 2381-2386, Feb. 1, 2008.
L. Lavoute et al., "Efficient four wave mixing from a picosecond fibre laser in photonic crystal fibre," Lasers and Electro-Optics 2009 and the European Quantum Electronics Conference. CLEO Europe—EQEC 2009. European Conference on, pp. 1, Jun. 14-19, 2009.

D. Nodop et al., "Efficient high-power generation of visible and mid-infrared light by degenerate four-wave-mixing in a large-mode-area photonic-crystal fiber," Optics Letters vol. 34, No. 32, pp. 3499-3501 (2009).
D. Trautlein et al., "Highly versatile confocal microscopy system based on a tunable femtosecond Er:fiber source," Journal of Biophotonics, vol. 1, No. 1, pp. 53-61 (2008).
J.C. Travers et al., "Extended blue supercontinuum generation in cascaded holey fibers," Optics Letters vol. 30, No. 23, pp. 3132-3134 (2005).
A. Kudlinkski et al., "Zero-dispersion wavelength decreasing photonic crystal fibers for ultraviolet-extended supercontinuum generation," Optics Express vol. 14, No. 12, pp. 5715-5722 (2006).
Arthur Dogariu et al., "Parametric generation and amplification in micro-structured fibers," Non-Linear Optics: Materials, Fundamentals, and Applications, Waikoloa, Hawaii, Aug. 2, 2004, Photonic Crystal Fibers, Optical Society of America, Aug. 2, 2004, p. WB3, 3PP, XP009149619.
T. Sylvestre et al., "Demonstration of Parametric Amplification at 1mu-meter by use of a microstructured optical fiber," 2009 IEEE/LEOS Winter Topicals Meeting Series, Jan. 1, 2009, pp. 189-190.
B. Rankin et al., "Stimulated-emission-depletion microscopy with a multicolor stimulated-Raman-scattering light source," Optics Letters vol. 33, No. 21, pp. 2491-2493 (2008).
E. Auksorius, "Stimulated emission depletion microscopy with a supercontinuum source and fluorescence lifetime imaging," Optics Letters vol. 33, No. 2, pp. 113-115 (2008).
International Search Report from PCT/GB2011/050106 (which published as WO2011/089441) (8 pages).
Per Dalgaard Rasmussen et al., "Degenerate four wave mixing in solid core photonic bandgap fibers," Optics Express, vol. 16, No. 6, pp. 4059-4068 (2008).
Jay E. Sharping et al., "Four-wave mixing in microstructure fiber," Optics Letters, vol. 26, No. 14, pp. 1048-1050 (2001).
C. Lesvigne et al., "Visible supercontinuum generation controlled by intermodal four-wave mixing in microstructured fiber," vol. 32, No. 15, pp. 2173-2175 (2007).
Dominik Wildanger et al., "STED microscopy with a supercontinuum laser source," Optics Express, vol. 16, No. 13, pp. 9614-9621 (2008).
Trefor Sloanes et al., "Optimisation of high average power optical parametric generation using a photonic crystal fiber," Optics Express, vol. 16, No. 24, pp. 19724-19733 (2008).
W.J. Wadsworth et al., "Supercontinuum and four-wave mixing with Q-switched pulses in endlessly single-mode photonic crystal fibres," Optics Express, vol. 12, No. 2, pp. 299-309 (2004).
W.J. Wadsworth et al., "Compact Supercontinuum Generation and four-wave mixing in PCF with 10ns laser pulses," Conference on Lasers and Electro-Optics, vol. 2, pp. 37-38 (2004).
L. Provino et al., "Compact broadband continuum source based on microchip laser pumped microstructure fibre," Electronics Letters, vol. 37, No. 9, pp. 558-560 (2001).
UKIPO Search Report pertaining to claims 35-40 of GB1001051.0 (1 page).
UKIPO Search Report pertaining to claims 1-17 of GB1001051.0 (2 pages).
Article 94(3) Communication from EPO Examination Division dated Dec. 5, 2013.
Couvoisier et al., Using a continuum of light in STED confocal microscopy, Apr. 14, 2006, Proc. SPIE 6191—Conference Volume: Biophotonics and New Therapy Frontiers, vol. 6191, pp. 619108-1 to 619108-10.
Rust et al., Sub-diffraction-limit imaging by stochastic optical reconstruction microscopy (STORM), Aug. 9, 2006, Nature Methods, vol. 3, Issue 10, pp. 793-796.
Govind Agrawal et al., Photonic crystal fiber tunes a femtosecond laser, 10.1117/2.1200602.0097 SPIE Newsroom.
Office Action issued by German Patent and Trademark Office for German Patent Application 10 2012 219977.2 on Dec. 15, 2014.
Machine Translation of the Office Action issued by German Patent and Trademark Office for German Patent Application 10 2012 219977.2 on Dec. 15, 2014.
Machine Translation of DE10322110.

(56) References Cited

OTHER PUBLICATIONS

Machine Translation of JP2004139064.
Examination Report under Section 18(3) issued by UKIPO for GB Patent Application GB1201902.2 on Nov. 13, 2014.
Response to the Examination Report dated Nov. 13, 2014 for GB Patent Application GB1201902.2, Mar. 10, 2015.
Amendments made to the specification of GB Patent Application GB1201902.2 in Response to the Examination Report dated Nov. 13, 2014, Mar. 10, 2015.
Written Opinion from PCT/GB2011/050106 (which published as WO2011/089441) (18 pages).
C. Xiong and W.J. Wadsworth, "Polarized supercontinuum in birefringent photonic crystal fibre pumped at 1064 nm and application to tuneable visible/UV generation," Optics Express vol. 16, No. 4, pp. 2438-2445 (2008).
Examination Report under Section 18(3) issued by the UKIPO on Apr. 2, 2015 for UK Patent Application GB1201902.2.
Response to the Examination Report under Section 18(3) filed on Jul. 30, 2015 for UK Patent Application GB1201902.2.
Specification Amendment accompanying the Response to the Examination Report under Section 18(3) for UK Patent Application GB1201902.2.
UKIPO Examination Report for UK Patent Application GB1201902.2 dated Oct. 16, 2015.

\* cited by examiner

LASER OR AMPLIFIER OPTICAL DEVICE SEEDED WITH NONLINEARLY GENERATED LIGHT

CROSS REFERENCE TO RELATED APPLICATIONS

The present application is a divisional of U.S. patent application Ser. No. 13/665,093, entitled "Laser or Amplifier Optical Device Pumped or Seeded with Nonlinearly Generated Light", filed 31 Oct. 2012, which application claims priority under 35 U.S.C. §119(e) to U.S. Provisional Patent Application Ser. No. 61/554,460, entitled "Laser or Amplifier Optical Device Pumped or Seeded with Nonlinearly Generated Light", filed 1 Nov. 2011 and under 35 U.S.C. §119(a) to Great Britain Patent Application GB 1201902.2, entitled "Laser or Amplifier Optical Device Pumped or Seeded with Nonlinearly Generated Light", filed 3 Feb. 2012. The foregoing applications are incorporated by reference herein.

FIELD OF THE INVENTION

The present invention relates to laser and amplifier optical devices and, more particularly, to optical fiber based pulsed amplifiers and lasers, and to methods of making and using laser and amplifier optical devices, such as fiber based pulsed amplifiers and lasers.

BACKGROUND

Fiber based lasers and amplifiers can act as "brightness converters" that convert high power, lower brightness pump light to coherent, higher brightness output light. Obtaining higher output powers—key for fiber based devices to become even more competitive with conventional gas and solid stated lasers—typically means delivering higher pump powers to the doped core (typically rare earth doped) of the active fiber of the fiber laser or amplifier. Higher power pump diodes or diode modules have a multimode (MM) output that lacks sufficient beam quality to readily directly couple to the small area core of a typical optical fiber. Single mode (SM) pump diodes have better beam quality and can directly couple, but typically have too low a power output.

A double clad (DC) fiber includes a larger inner cladding ("pump cladding") surrounding the smaller, active core and a second cladding about the inner cladding. MM pump diodes can couple to the larger area of the inner cladding/core, and the pump light is absorbed by the active material in the core as the light propagates within the inner cladding. Pump light absorption (typically measured in dB/meter) is significantly reduced compared to core pumping, and so the length of the gain fiber is increased to provide for a total required absorption. For many devices, such as continuous wave (CW) devices, the increased length is a small price to pay for the increased output power, and the DC fiber represented a key advance.

Increased power output (e.g., one or more of average power, peak pulse power, or pulse energy) of pulsed lasers and amplifiers is also of keen interest. However, such devices are more complex, and obtaining increased power output is more problematic, especially as the pulse duration decreases. Pulsed devices, as well as CW lasers and amplifiers, could benefit from improvements.

SUMMARY OF THE INVENTION

Applicants have considered the problem of extracting higher powers from, as well as providing other improvements in, laser and amplifier optical devices, with particular regard to pulsed optical fiber amplifiers, such as, for example, those based on rare earth active material (e.g., ytterbium (Yb)) and providing sub nanosecond (1 ns or less) pulses.

Pulsed fiber lasers and amplifiers involve high peak powers that can trigger nonlinearities that limit useful output power. Such nonlinearities can include self-phase-modulation (SPM), stimulated Raman Scattering (SRS) or stimulated Brillouin scattering (SBS). The strengths of all of these nonlinear effects scale either linearly (for SPM) or exponentially (for SRS and SBS) in proportion to fiber length and pulse power, and in inverse proportion to the mode area of the propagating mode. In effect, there is often an interaction length associated with these deleterious nonlinear phenomena, meaning that either the threshold for onset is a function of the length of the gain fiber (and is higher for shorter lengths) and/or the amount of energy lost to nonlinear effects remains below an unacceptable amount for the shorter lengths of gain fiber. DC fiber designs having reduced absorption per unit length and hence requiring an increased length to meet a total absorption target can be a less desirable option for a pulsed fiber amplifier, especially for sub nanosecond pulses (as shorter pulses typically involve higher peak powers). The benefit of coupling the higher MM pump power can be mitigated by the lowered nonlinear threshold—the higher pump power cannot all be turned into useful output power.

As noted above, SM pump diodes can core pump a gain fiber for high absorption, but often have insufficient power. Some CW fiber lasers have higher power, and in principle a fiber device can be core pumped by another fiber laser. However, the range of fiber laser output wavelengths is small and typically does not fall within the narrow absorption bandwidth of the gain material to be optically pumped. For example, Er doped fibers are most often configured to produce 1550 nm light, whereas Yb is typically pumped at about 915 nm or at about 980 nm. Because gain materials can have multiple absorption peaks a fiber laser can be designed to provide a desired pump wavelength for a fiber amplifier having the same gain material. For example, a Yb fiber laser can be constructed to receive 915 nm pump energy and provide a 976 nm output, which is a suitable pump wavelength for a downstream Yb pulsed fiber amplifier that amplifies 1060 nm pulses. However, such a 976 nm Yb fiber laser will typically require a complex fiber design to suppress lasing at about 1 micron and is further susceptible to photodarkening due to the high inversion required to favor 976 nm output. Such a laser can also have low efficiency.

In considering the foregoing, Applicants have discovered improvements that can provide for higher output power laser and amplifier optical devices, including, for example, methods and apparatus for more effective pumping for high absorption, which can allow shorter lengths of gain fiber, as is discussed in more detail below. The shorter lengths can have higher thresholds for the onset of a deleterious nonlinearity, and hence allow higher output power. As will also be evident below, other teachings are provided as well, including, for example, methods and apparatus directed to improved seed sources and narrow bandwidth sources. Generally, the teachings herein are considered of use in laser and amplifier optical devices other than pulsed fiber devices, and, as regards fiber devices, in both core pumped and cladding pumped applications.

Accordingly, in one aspect, the disclosure teaches an optical apparatus comprising an optical source for providing output light for providing input signal light or pump light. The optical source can comprise a pump source for pumping a four wave mixing (FWM) process with light pulses ("FWM pump light") as well as a FWM element in optical communication with the pump source, where the FWM element is configured for hosting the FWM process to generate, responsive to the FWM pump light, pulses of FWM signal light and FWM idler light having different wavelength. The optical apparatus can further include a laser or amplifier optical device comprising a gain material for providing optical gain at a gain wavelength via a process of stimulated emission responsive to optical pumping with pump light, where the laser or amplifier optical device is in optical communication with the optical source for receiving one of the FWM signal light and the FWM idler light as pump light or as input signal light having a gain wavelength for optically pumping or seeding with input signal light the laser or amplifier optical device.

The gain material can comprise a rare earth doped (RED) material. The laser or amplifier optical device can comprise an optical fiber, where the optical fiber comprises the gain material. The FWM element can comprise a microstructured optical fiber. The laser or amplifier optical device can receive both of the FWM signal and FWM idler light, one being received as pump light and the other as input signal light for both optically pumping and seeding with the input signal light the laser or amplifier optical device. The pump source can comprise a selected RED material that comprises a rare earth comprised by the RED material. The RED material can comprise one or more of holmium, neodymium, erbium, ytterbium or thulium.

The laser or amplifier optical device can receive the one of the FWM signal and FWM idler light as the pump light for optically pumping the laser or amplifier optical device. The laser or amplifier optical device can receive the one of the FWM signal and FWM idler light as input signal light having the gain wavelength for seeding the laser or amplifier optical device. The one of the FWM signal and idler light can be substantially single mode and have an average power of, in various practices, at least 2 W, at least 5 W or at least 10 W. The laser or amplifier optical device can comprise a gain optical fiber that is substantially core pumped with one of the FWM idler or FWM signal light.

The laser or amplifier optical device can receive both pump light and input signal light having a gain wavelength and the optical apparatus can be configured for changing the time duration or the repetition rate of the input signal light or the pump light such that the pump and input signal light received by the laser or amplifier optical device have one of different repetition rates or different time durations. The optical apparatus can be configured for changing the time duration of the input signal light or of the pump light. The optical apparatus can be configured for changing the repetition rate of the input signal light or of the pump light.

The optical apparatus can be configured for providing a portion of the FWM pump light to the laser or amplifier optical device as input signal light having a gain wavelength for seeding the laser or amplifier optical device. The laser or amplifier optical device can receive input signal light having a gain wavelength or pump light from a source other than the FWM signal light and other than the FWM idler light. The optical apparatus can be configured for the laser or amplifier optical device to receive input signal light having a gain wavelength and the optical apparatus can comprise a pulse picker for reducing the repetition rate of the input signal light prior to the delivery thereof to the laser or amplifier optical device.

The laser or amplifier optical device can comprise an optical amplifier for receiving the one of the FWM signal light and FWM idler light for one or both of being optically pumped with pump light or seeded with input signal light, where the optical amplifier comprises an optical fiber comprising the gain material (e.g., a RED material) for providing the optical gain. The optical amplifier can produce substantially single mode pulses comprising a temporal pulse width of no greater than 100 ps, a pulse energy of at least 50 microjoules and a wavelength of in the range of 900 to 2500 nm. The optical amplifier can produce substantially single mode pulses comprising a peak power of at least 200 kW and the length of the optical fiber along which the fiber includes the gain is, in one practice, no greater than 1 meter. The amplifier can receive the one of the FWM signal and idler light as substantially single mode pump light, where the optical apparatus is configured such that the optical fiber absorbs the pump light along at least part of its length at the rate of at least 5 dB per meter. The amplifier can receive one of the FWM signal and idler light as pump light, where the optical fiber is substantially core pumped with the pump light. The amplifier can receive the one of the FWM signal and idler light as pump light, and the optical apparatus can be configured such that the optical fiber absorbs at least 10 dB of the pumping light over a length of no greater than 50 cm.

The optical apparatus can comprise a second FWM element, where the second FWM element is configured for hosting a second FWM process generating second FWM signal and second FWM idler light, and wherein the laser or amplifier optical device receives one of the second FWM signal and idler light as pump light or as input signal light having a gain wavelength for optically pumping or seeding with input signal light the laser or amplifier optical device.

The optical apparatus can provide output pulses having a time duration of 1 ns or less. The optical apparatus can provides output pulses having a time duration of 200 ps or less. The optical apparatus can provides output pulses having a time duration of 100 ps or less.

The FWM element can consist essentially of glass.

Regarding configuring the optical apparatus such that the pump light and input signal light have different time durations (i.e., different temporal pulse widths) or different repetition rates, in one practice, the pump light and the input signal light have different time durations (i.e., different temporal pulse widths); in another, they have different repetition rates; in another practice they have both different time durations and different repetition rates. In various practices of the invention one or both of the repetition rates or time durations can be different by, for example, at least 10%, at least 15%, at least 25% or at least 50%, as determined by the absolute value of the difference divided by the lower of the two values and appropriate conversion to percentage form. In other practices, the repetition rate, the time duration or both can vary by 100%, 200% or 500% or one, two, or even three orders of magnitude (e.g., a repetition rate reduction in one optical path from 40 MHz to 100 KHz, with the other remaining at 40 MHz).

The present disclosure also teaches a stand alone pump and/or input signal source.

In one aspect, the disclosure teaches an optical apparatus, comprising an optical source configured for providing output light for providing input signal light or pump light. The optical source can comprise a pump source for pumping a four wave mixing (FWM) process with light pulses ("FWM pump light") and a FWM element in optical communication with the pump source, where the FWM element is configured for hosting the FWM process to generate, responsive to the FWM pump light, pulses of FWM signal light and FWM idler light having different wavelengths. The optical source can be configured such that the output light comprises one of the FWM signal light or the FWM idler light as pump light having a pumping wavelength or as input signal light having a gain wavelength for pumping or seeding with input signal light a laser or amplifier optical device comprising a gain material for providing optical gain, where the gain material has absorption and emission spectra defining gain and pumping wavelengths at which, respectively, the gain material is arranged in the device to provide optical gain via a process of stimulated emission responsive to being pumped.

The gain material can comprise a rare earth doped (RED) material for providing the optical gain. The FWM element can comprise a microstructured optical fiber. The optical source can comprise an output optical fiber for delivering the output light, the output optical fiber comprising a multimode core having a cross sectional area selected to substantially match the cross sectional area of the pump cladding of a cladding pumped (double clad) optical fiber, such as DC fiber input to an optical fiber laser or amplifier. The optical source can comprise an output optical fiber for delivering the output light, where the output optical fiber comprises a multimode core having a diameter of at least 50 microns, which can be selected to substantially match the cross sectional area of the core of input fiber of an optical fiber pump combiner.

The one of the FWM signal and FWM idler light can comprise the pump light having a pumping wavelength and the other can comprise input signal light having a gain wavelength, where the output light comprises both of the FWM signal and FWM idler light for both pumping with pump light and seeding with input signal light the laser or amplifier optical device comprising the gain material. The pump source can comprise a selected RED material that comprises a rare earth comprised by the RED material.

The present disclosure also includes methods, some of which are described in detail below, and others which can be ascertained by the skilled worker upon review of the disclosure herein pertaining to apparatus and systems, where disclosure of the operation or functioning of an apparatus or system is considered disclosure in support of a method reciting steps directed to the disclosed operation or functioning.

In one aspect, there is provided a method of providing output light for pumping with pump light or seeding with input light a laser or amplifier device comprising a gain material for providing optical gain at a gain wavelength via a process of stimulated emission responsive to receiving pump light for creating a population inversion. The method can comprise generating at least one of FWM signal light and FWM idler light with a four wave mixing (FWM) process, wherein one of the FWM signal light and idler light has a pumping wavelength or a gain wavelength of a laser or amplifier optical device comprising the gain material, where the gain material has absorption and emission spectra defining the gain and pumping wavelengths at which, respectively, the gain material is arranged in the device to provide optical gain responsive to being optically pumped.

The gain material can comprise a RED material for providing the optical gain.

In one practice, one of the FWM signal and FWM idler light can comprise a pumping wavelength of the gain material and the other can comprise a gain wavelength of the gain material. The step of generating can include pumping a selected RED material that includes a rare earth comprised by the gain material of the laser or amplifier optical device. One of the FWM signal and idler light can comprise a pumping wavelength of the gain material and the step of generating can include pumping a selected RED material wherein the pumping wavelength is also a pumping wavelength of the selected RED material. One of the FWM signal and idler light can comprise a pumping wavelength. One of the FWM signal and idler light can comprise a gain wavelength.

In another aspect, the disclosure teaches a method of pumping or seeding with input light a laser or amplifier device comprising a gain material, the gain material for providing optical gain at a gain wavelength via a process of stimulated emission responsive to optical pumping with pump light having a pumping wavelength. The method can comprise generating the at least one of FWM signal and FWM idler light with a FWM process and pumping the laser or amplifier optical device with one of the FWM signal and FWM idler light as pump light or seeding the laser or amplifier optical device with one of the FWM signal or FWM idler light as input signal light having a gain wavelength of the gain material.

The gain material can comprise a RED material for providing the optical gain. The laser or amplifier optical device can be pumped with one of the FWM signal and FWM idler light as pump light. The laser or amplifier optical device can be seeded with one of the FWM signal and FWM idler light as input signal light having a gain wavelength. The laser of amplifier optical device can be seeded with one of the FWM signal and FWM idler light as input signal light having a gain wavelength and pumped with the other of FWM signal and FWM idler light as pump light.

Practices of the methods can include generating FWM pump light having a FWM pump wavelength for pumping the FWM process for the generating of the at least one FWM signal and FWM idler light; pumping the laser or amplifier optical device with one the FWM signal and idler light as pump light; and seeding the laser or amplifier optical device with input signal light having the FWM pump wavelength for amplification responsive to the pumping of the laser or amplifier optical device with the one of the FWM signal and idler light.

The input signal light can comprise a portion of the FWM pump light.

Light, as that term is used herein, is not understood to be limited to visible light but is used in the broader sense of optical electromagnetic energy.

Time durations, such as pulsewidths, and bandwidths as specified herein are full width, half maximum (FWHM) time durations and bandwidths.

A gain material, as that term is used herein, means a material that can provide optical gain at a wavelength (referred to herein as a "gain wavelength") responsive to being optically pumped at another wavelength (referred to herein as a "pump or pumping wavelength"). The gain wavelength can comprise the output wavelength of a laser cavity or an amplified input signal output by an optical amplifier. However, the concept of optical pumping and gain is not limited to a laser or amplifier, and the term "laser or amplifier optical device" (or "laser and amplifier optical device") is used herein to include the broader class of devices that involve optical gain responsive to optical pumping. Typically, the optical gain is produced via a process of stimulated emission responsive to a population inversion created by the optical pumping.

A gain material can comprise a RED material. RED material, as that term is used herein, means a material comprising one or more of the rare earths (typically as ions) such as, for example, one or more of the Lanthanide elements of the periodic table (e.g., elements having atomic numbers from 57 to 71). Erbium (Er), neodymium (Nd), holmium (Ho), thulium (Tm), and ytterbium (Yb) are all understood to be RED materials that are particularly useful in laser or amplifier optical devices, such as, for example, optical lasers, amplifiers, amplified spontaneous emission (ASE) sources or superfluorescent sources. Er/Yb is an example of a useful RED material comprising more than one rare earth. A gain material, however, need not comprise a RED material. For example, a gain material can comprise Ti-Sapphire, which is used in many solid state lasers.

The FWM signal or idler light can be primarily derived from the FWM process, meaning that at least the majority of the optical power of the FWM signal or idler light is generated by the FWM process. Typically, the FWM signal light and/or the FWM idler light has a bandwidth not in excess of 50 nm.

The foregoing features of this Summary can be combined with any of the other features in any of the aspects, practices or embodiments of the disclosure described herein, except where clearly mutually exclusive or a statement is explicitly made herein that such a combination is unworkable. To avoid undue repetition and length of the disclosure, every possible combination is not explicitly recited. As the skilled worker can ascertain, the methods of the present disclosure can include any of the features, or steps relating to the function or operation thereof, disclosed in conjunction with the description herein of apparatus and systems.

Not every component is labeled in every one of the foregoing FIGURES, nor is every component of each embodiment of the invention shown where illustration is not considered necessary to allow those of ordinary skill in the art to understand the invention. The FIGURES are schematic and not necessarily to scale.

When considered in conjunction with the foregoing FIGURES, further features of the invention will become apparent from the following detailed description of non-limiting embodiments of the invention.

DETAILED DESCRIPTION

Figure 1A:
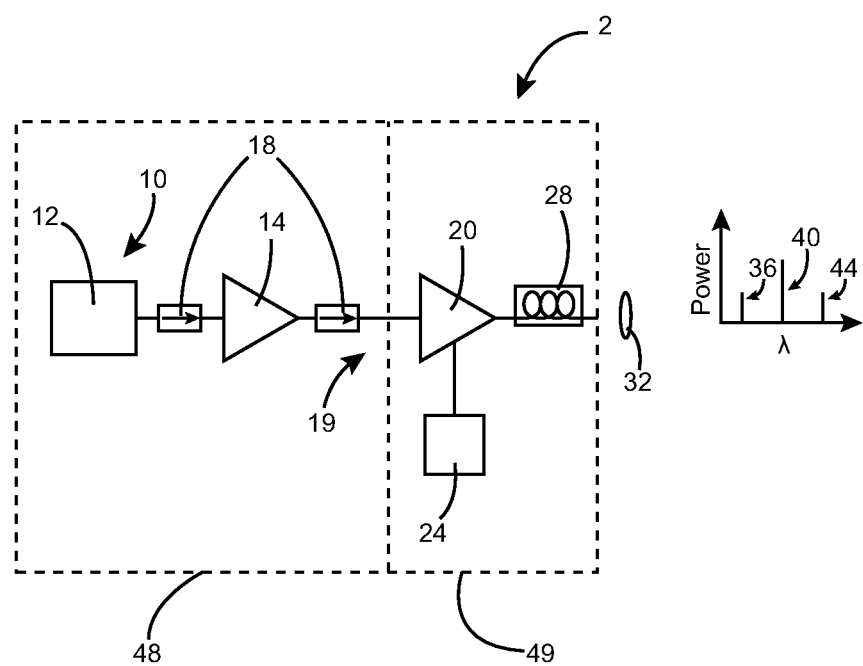
FIG. 1A schematically illustrates an optical apparatus according to the present disclosure configured for providing pump light and/or input signal light using a four wave mixing (FWM) process.

FIG. 1A schematically illustrates one embodiment of an optical apparatus 2 for providing output light for pumping and/or seeding with input signal light a laser or amplifier optical device. The optical apparatus 2 can comprise an oscillator 10, which can comprise a low power modelocked fiber oscillator 12. The fiber oscillator 12 can operate at a pulse repetition rate of approximately 40 MHz and at a wavelength of approximately 1064 nm so as to deliver pulses of approximately 20 ps in duration with an average power of approximately 2 mW. The amplifier 14, which can comprise a fiber amplifier acting as a "pre amplifier", is in optical communication with the oscillator 10 and provides an amplified output of approximately 100 mW. The optical isolators 18 are interposed downstream and upstream of the amplifier 14 for providing isolation between the oscillator 10 and between amplifier stages, as is common in the art. The amplifier 19, which can comprise a double-clad (DC) Yb doped fiber amplifier 20 pumped by high brightness multimode diode lasers 24, is in optical communication with the amplifier 14 and provides further amplification to an output of 10 Watts average power (12.5 kW peak power).

The amplified, high peak power pulses at the 1064 nm pump wavelength are injected into a nonlinear element 28 downstream of the amplifier 20. The nonlinear element 28 is configured to produce, via a selected nonlinear process, optical energy at a wavelength or wavelengths suitable for seeding with an input signal and/or pumping a downstream optical amplifier or laser device (shown in subsequent FIGURES). For example, the nonlinear optical element 28 could produce, responsive to receiving the 1064 nm pump light, 976 nm light, which is a suitable wavelength for pumping a downstream Yb doped amplifier or laser. The 976 nm output of the optical apparatus 2 can be few moded or substantially single moded for more effective coupling to the Yb of the downstream amplifier, allowing for a higher absorption per unit length within the amplifier and hence shorter lengths of the gain fiber, providing higher power outputs before the onset on limiting nonlinear effects, such as, for example, SRS.

The optical apparatus can include an output optic 32, which can comprise one or more lenses, for collimating or focusing the output light from the optical apparatus 2. The optical apparatus can include, alternatively or additionally to the output optic 32, an output optical fiber for delivering the output light. The output optical fiber can comprise a multimode core having a cross sectional area selected to substantially match the cross sectional area of the pump cladding of a cladding pumped (DC) optical fiber (not shown), such as for end pumping a DC fiber based laser or amplifier device. The output optical fiber can comprise a multimode core having a diameter of at least 50 microns, such as for coupling to an optical fiber input arm of optical fiber pump coupler for coupling to a laser or amplifier optical device. The output optical fiber can comprise a substantially SM optical fiber (e.g., a 10 μm core diameter).

In certain practices, described in more detail below, the optical apparatus can 2 provide output light having a wavelength suitable for seeding a downstream amplifier with input signal light to be amplified by the amplifier. In other practices, the optical apparatus 2 provides light having a plurality of wavelengths, where light having one of the wavelengths pumps the downstream amplifier so as to amplify input signal light having another of the wavelengths.

In a preferred embodiment, the nonlinear element 28 comprises a FWM element configured for four wave mixing to produce outputs at signal and idler wavelengths responsive to the optical energy output from the amplifier 20 as a FWM pump light. FWM is a nonlinear optical process, typically generated using pulsed lasers and a nonlinear medium. When pumping the nonlinear medium at a FWM pump wavelength ($\lambda_{pump\text{-}FWM}$), some of the energy is converted to a pulse at a "signal" wavelength ($\lambda_{signal}$) and at an "idler" wavelength ($\lambda_{dialer}$), wherein $\lambda_{idler} > \lambda_{pump\text{-}FWM} \lambda_{signal}$.

More particularly, FWM is a third-order nonlinear effect (like self-phase modulation and cross-phase modulation). When a highly intense pump signal with a frequency $\lambda_{pump\text{-}FWM}$ propagates in an appropriate medium, such as an appropriate glass optical fiber, it induces a refractive index modulation in the glass (Kerr nonlinearity) which also occurs at two phase-matched frequencies $\lambda_{idler}$ and $\lambda_{signal}$. This in turn creates two new beams with frequencies defined by the phase matching condition: $v_{idler} + v_{signal} - 2 \cdot v_{pump\text{-}FWM} = 0$ or, rearranging terms, $2 \cdot v_{pump\text{-}FWM} = v_{idler} + v_{signal}$. Two FWM pump photons are thus converted into one photon at a signal wavelength (short wavelength) and one photon at an idler wavelength (long wavelength).

Depending on the choice of $\lambda_{pump\text{-}FWM}$ and the design of the nonlinear device, one can define, select, and even tune the wavelengths $\lambda_{idler}$ and $\lambda_{signal}$. The conversion efficiency from the FWM pump pulse to the signal and idler pulses can be higher than 30%, and can be enhanced through seeding the process with energy at the signal, pump or idler wavelength. FWM in bulk and fiber devices is known in the art and reported in detail elsewhere—see for example Applicant's PCT application PCT/GB2011/050106.

In the embodiment shown in FIG. 1A, the nonlinear element 28 can comprise a silica microstructured fiber (also referred to herein as a photonic crystal fiber or "PCF"). Microstructured fibers include longitudinally extending features (typically voids or holes) that promote guidance in the core via a total internal reflection or via a photonic bandgap effect. FWM in microstructured optical fibers has been demonstrated by Wadsworth et al, "Supercontinuum generation and four-wave mixing with Q-switched pulses in endlessly single-mode photonic crystal fibers", Optics Express, Vol. 12, No. 2, 2004.

As will be well known to the person skilled in the art, the FWM energy conservation condition depends on the effective indices of each component, and phase matching can be obtained in single mode fiber by choosing adequate dispersion characteristics. The dispersion of microstructured fibers can be controlled by controlling the hole size, hole to hole separation (pitch), and mode field diameter of the fiber. The dispersion of a microstructured fiber can be calculated using the empirical method outlined by Saitoh et al., *Empirical relations for simple design of photonic crystal fibers*, Optics Express Vol. 13, pp 267-275, 2005. Based on this calculation and the satisfaction of the phase matching condition, the signal and idler frequencies generated by a given microstructured fiber, when pumped at a defined pump wavelength, can be calculated. It will be appreciated that there is a range of fiber designs capable of delivering a required signal or idler wavelength.

In the embodiment of FIG. 1A the PCF of the nonlinear element 28 can have a hole spacing (pitch) of 3.1 μm and a hole diameter to pitch ratio of approximately 0.31, yielding with zero dispersion wavelength of approximately 1068 nm. With reference to the inset of FIG. 1A, within the PCF of the nonlinear element 28, some of the energy at the FWM pump wavelength 40 is converted via FWM to signal and idler pulses, with the FWM signal pulse having a signal wavelength 36 centered at approximately 940 nm and the idler pulse at an idler wavelength 44 centered at approximately 1230 nm. The conversion efficiency, taking into account conversion from the pump into both the signal and idler wavelengths, can be at least 15%, at least 20%, at least 25%, or at least 30%. However, the efficiency of the conversion process from the pump to one of the idler and signals pulses (e.g., the signal) can be as high as at least 15%, at least 20%, at least 25%, or at least 30%. The higher efficiencies can be more readily achieved by seeding the FWM process of the apparatus of FIG. 1A (not shown explicitly in FIG. 1A but shown in and discussed in conjunction with FIG. 2, and equally applicable to FIG. 1A). In one example of seeding the FWM process, laser light from a narrow band (<0.2 nm) low power diode laser operating at a wavelength of approximately 940 nm (corresponding to the signal wavelength of the FWM process) can be injected into the PCF via a wavelength division multiplexer to seed the FWM process.

By way of example and not limitation, it is noted that the foregoing recited efficiencies are understood to form part of the disclosure for any of the FWM processes of any of the apparatus or methods described herein.

In the present example, greater than 3 Watts of single mode pulsed pump light (the signal light of the FWM process) can be delivered as an output from the apparatus 2 in a single mode optical fiber, where the optical amplifier 20 comprises a 10 Watt cladding-pumped fiber amplifier. Scaling of the FWM signal power can be attained through scaling the power of the amplifier 20 and modifying the parameters of the oscillator 10 to attain optimum efficiency. Commercial double clad amplifiers at 1064 nm can deliver in excess of 40 Watts average power, enabling more than 10 Watts to be delivered at the FWM signal wavelength suitable for substantially single-mode pumping (or seeding with an input signal) or a laser or amplifier device.

For future reference it is noted that for some purposes it can be helpful to think of the optical apparatus 2 as comprising a source section 48 that provides low power light and that can include, for example, the oscillator 10 and the amplifier 14 and a nonlinear section 49 that can include the amplifier 20 and nonlinear element 28.

Figure 1B:
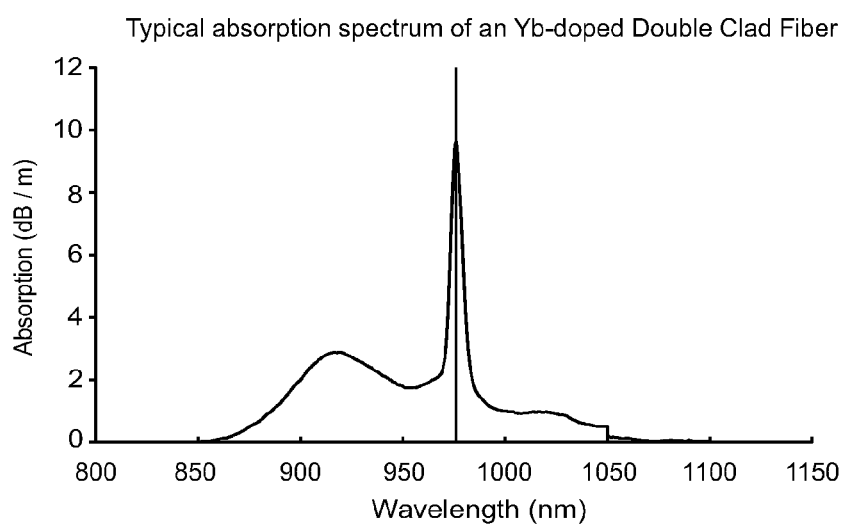
FIG. 1B schematically illustrates an absorption spectrum curve for one example of an optical fiber doped with ytterbium (Yb)

FIG. 1B illustrates a measurement of absorption spectrum of a typical Yb doped DC optical fiber. The peak absorption is centered at a wavelength of approximately 980 nm and extends down towards 850 nm and upward towards 1050 nm, where absorption level can be significantly lower. Typically, the Yb spectrum shown in FIG. 1B is pumped in the range of about 910 nm to about 920 nm, in the range of about 940 to about 960 range, or in the range of about 976 nm, mainly because traditionally, diodes have been available at these wavelengths and because the absorption is fairly flat over these ranges, making the amplifier absorption relatively insensitive to changes in output wavelength of the pump diodes due to, for example, temperature changes. Pumping, as the skilled worker is aware, creates the population inversion for stimulated emission for providing the gain for lasing or amplification. Thus the signal wavelength of 940 nm produced by the FWM nonlinear process of the optical apparatus 2 can be used to pump an Yb based amplifier or laser.

FIG. 1B also helps illustrate an advantage of the optical apparatus 2 of FIG. 1A over prior art pump sources, such as MM diode sources, that pump DC or cladding pumped fiber devices. The absorption at 976 nm is on the order of 10 dB/m, reducing towards 3 dB/m at approximately 915 nm and 1 dB/m at approximately 870 nm. The inner or pump cladding diameter of the fiber is approximately 125 μm and the core diameter is approximately 10 μm. For a DC fiber, the absorption is reduced by the core-cladding area ratio (which is $10^2/125^2$). Accordingly, such a fiber under core pumping has, in theory, an absorption more than 150 times that plotted in FIG. 1A, or 150 dB/m at 870 nm, increasing to 1500 dB/m at 976 nm. Thus, more effective pumping of the fiber of FIG. 1A, such as, for example, coupling pump energy directly to the core, can provide significant reduction in the length of the Yb gain fiber needed to reach a given total absorption of, for example, 10 dB. The absorption is also related to the concentration of Ytterbium ions in the Yb fiber, which can be controlled during manufacture. In core-pumped amplifiers, due to the very high absorption, it can be possible as well as attractive to reduce the concentration of Yb ions or to pump at a wavelength where absorption is somewhat lower. This can reduce photodarkening or have other benefits.

The FWM signal and FWM idler wavelengths can be changed by either using a different PCF with different zero dispersion wavelength or by using a different pump wavelength. For example, it is possible to use a shorter wavelength pump pulse and generate signal pulses at 808 nm (useful for pumping neodymium doped optical fibers and bulk amplifier glasses) or at 915 nm. It is also possible to use a longer wavelength pump pulse to shift the FWM signal wavelength towards 976 nm. Both 915 nm and 976 nm are suitable wavelengths for pumping Ytterbium and Erbium doped optical fibers and bulk amplifiers.

Using this approach, by changing the wavelength of the pump pulse light or the PCF itself, it is possible to select the FWM signal and idler wavelengths. Accordingly, multiple FWM sources of different wavelengths can be coupled together efficiently using, for example, wavelength division multiplexing (WDM), dichroic mirrors, or polarization beam combination. For example, as shown in FIG. 1A, Yb can be pumped in the spectral range from 910 nm to 976 nm. This wide absorption band of the fiber allows the use of multiple FWM sources, for example, one providing an output (e.g., FWM signal light) at 910 nm, one providing an output at 920 nm, and perhaps one providing an output at 940 nm to be efficiently coupled into the Yb doped fiber.

The DC fiber amplifier 20 can be pumped in a co-propagating fashion, whereby the pump and signal light travel in the same direction, and any un-absorbed pump light from the pump laser diode 24 which overlaps with the core of the amplifier output delivery fiber can be used to seed the FWM process in the PCF of the nonlinear element 28. Here, one would select the pump diode 24 wavelength to overlap with the desired FWM output signal wavelength. The use of seeding enables efficient FWM and generation of signal and idler pulses with relatively clean and narrow spectral profiles and with temporal and noise parameters similar to those of the original pump pulse originating from the oscillator 10.

As will be clear to the skilled worker upon study of the present disclosure, in FIG. 1A as well as the other FIGURES and/or embodiments of the present disclosure, the oscillator 10 can be any source, and is not limited to the modelocked fiber oscillator 12. For example, the oscillator 10 can comprise a gain switched or directly pulsed laser diode, a Q-switched microchip laser or a pulsed or modelocked solid-state laser oscillator. Moreover, though in the examples of the disclosure a single oscillator 10 is typically shown, multiple oscillators having different roles within the system could be used, such as seed lasers for the amplified system and seed or signal lasers oscillator for generating FWM light. Similarly, though the various amplifiers described herein are typically referred to as fiber amplifiers, other types of amplifiers are known in the art and can be used. Also, although a microstructured fiber is described as the nonlinear element 28 in FIG. 1A, in other examples the nonlinear element can comprise a conventional optical fiber, a planar waveguide, a bulk, liquid, or gas medium. Furthermore, although the embodiments illustrated herein typically show an optical fiber amplifier receiving one or both of FWM signal and idler light, this is exemplary, and more generally, a laser or amplifier optical device can be substituted for the illustrated amplifier.

In a typical practice of the disclosure, the FWM process is preferably not accompanied by supercontinuum (SC) generation.

Accordingly, in one embodiment of the present invention, there is provided a source of pump and/or input signal radiation for pumping and/or seeding with an input signal laser and amplifier optical devices, where the source can have a significant portion of its energy within a single TE mode (e.g., the fundamental mode) or a few higher order modes, such that the power can be efficiently coupled into small waveguides and beams within fiber, bulk, and planar amplifier devices. The source can generate input signal light and/or pump light via nonlinear processes, such as a parametric process, such as FWM. There can be provided a stand-alone pump optical apparatus that is flexible in being able to produce a range of suitable pump and/or seed laser wavelengths for a range of different amplifier or laser gain media.

Figure 2:
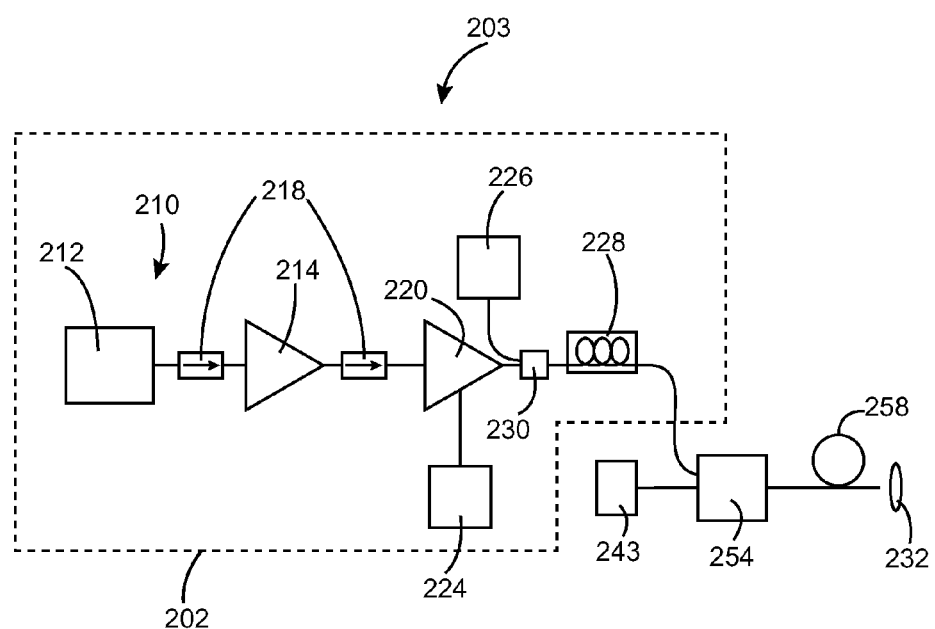
FIG. 2 schematically illustrates an optical apparatus according to the present disclosure and including an optical amplifier pumped and/or seeded with input signal light by an optical apparatus such as that of FIG. 1A.

FIG. 2 schematically illustrates an optical apparatus 203 including an optical device pumped and/or seeded with an input signal by a pump and/or seed source. The optical apparatus 203 of FIG. 2 includes features that are substantially the same as the optical apparatus of the other embodiments, such as are discussed in conjunction with the various FIGURES, with the modifications now described. Similar reference numbers are retained for corresponding features (with the proviso that reference numbers of FIG. 2 are numbered in the 200s, such that 214 corresponds to 14 of FIG. 1A, 314 of FIG. 3, etc.). Corresponding or other features described in more detail elsewhere herein may be described in less detail or not at all in conjunction with FIG. 2 so as to avoid undue repetition. Nevertheless, the features can also be part of the embodiment of FIG. 2, such as by being substitutions or additions, excepting combinations involving clearly mutually exclusive features.

The optical apparatus 203 can be considered to include an optical source, indicated by dotted lines 202, and which can comprise the optical apparatus 2 of FIG. 1A. The optical source 202 pumps a RED amplifier 258, such as an Yb doped amplifier, with 940 nm pulsed pump light to amplify a pulsed input seed signal, such as 1060 nm seed signal, provided by source 243. The combiner 254 combines the 940 nm and 1060 nm light for delivery to the amplifier 258. Optional optics 232 can condition the light received from an output fiber of the amplifier 258 to provide a suitable output beam. The source 202 can include a seed source 226 operating at one of the signal, pump or idler wavelengths for seeding the FWM process. The combiner 230, which can comprise a wavelength division multiplexing (WDM) combiner, can combine the seed pulse for the FWM process with the output of the optical amplifier 220 for injection into the PCF of the nonlinear element 228. In the embodiment shown in FIG. 2, the seed source 226 can comprise a narrow band (<0.2 nm) low power diode laser 226 operating at a wavelength of approximately 940 nm (corresponding to the signal wavelength of the FWM process).

The RED amplifier 258 typically comprises a length of Yb doped optical gain fiber. The optical amplifier 258 is more effectively pumped (such as by being substantially core pumped) allowing for increased absorption. Because there is also sufficient pump power, the length of the gain fiber can be reduced to increase one or more nonlinear thresholds, while still maintaining good total absorption. In various practices of the disclosure, the length of the gain fiber is no longer than 100 cm, no longer than 75 cm, no longer than 50 cm, no longer than 40 cm, no longer than 30 cm, or no longer than 25 cm. The absorption can be at 2.5 dB/meter, or at least 5 dB/meter, or at least 10 dB/meter. The optical apparatus can be configured such that gain fiber can, in various practices of the disclosure, provide at least 5 dB, or at least 10 dB, of absorption along, for example, 50 cm of length, or along 40 cm of length, or along 30 cm of length, or along 25 cm of length. By way of example and not limitation, (as it should be clear to the skilled worker apprised of the full disclosure) the foregoing recitations regarding lengths and absorptions form part of the disclosure as to any laser or amplifier optical device disclosed rein that receives pump or input seed energy generated by a nonlinear process such as FWM.

Figure 3:
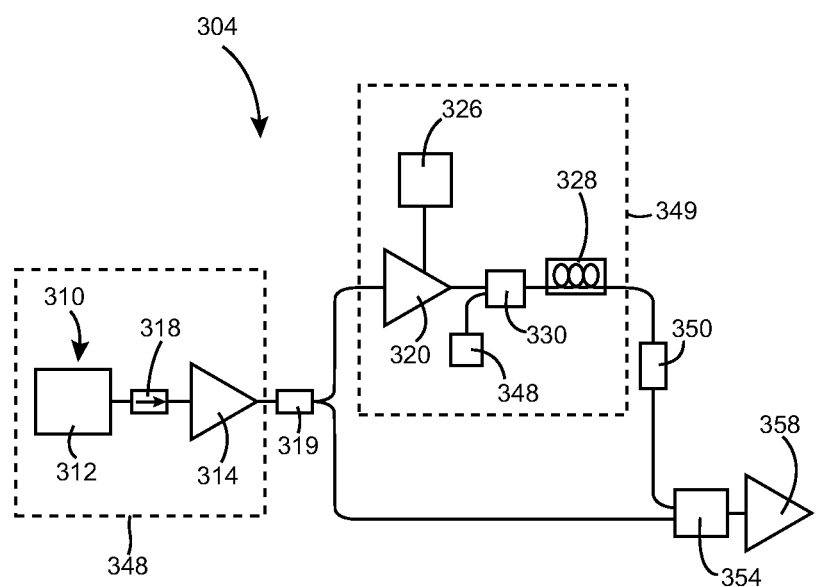
FIG. 3 schematically illustrates an optical apparatus according to the present disclosure including an optical amplifier and a pump source for the optical amplifier sharing a common seed source.

The optical apparatus 203 of FIG. 2 can include a filter for attenuating unwanted wavelengths. The filter can be located, for example, upstream of the amplifier 258 and downstream of the optical source 200 (or at least downstream of the nonlinear element 228) for attenuating unwanted wavelengths A wavelength can be unwanted because it is undesirable that it be amplified by the amplifier 258; for example, it may be undesirable that one or more of FWM signal, idler or residual FWM pump wavelengths be amplified. A filter 350 is shown in FIG. 3 and can be included with the apparatus 203 of FIG. 2 to attenuate unwanted wavelengths, as described in the discussion of FIG. 3.

The optical source section 202 can be used to generate pump energy at a pump laser wavelength as previously described, but can be equally useful as a seed laser source that provides light at a wavelength for seeding a laser or amplifier optical device with input signal light, such as for amplification. For example, through selection of the pump laser wavelength and/or through design of the PCF of the nonlinear element 28, the FWM process can produce an idler pulse at an idler wavelength corresponding to a gain wavelength of the RED or other gain material of an optical amplifier. Such an approach enables the generation of input light at wavelengths that might otherwise be more difficult to generate, for example due to lack of suitable gain medium or optical components at the wavelength.

A specific example is in the generation of pulsed light in the 2 μm spectral range, which can be useful for seeding thulium, holmium or thulium/holmium doped optical fiber amplifiers. High power DC amplifier fibers with Tm, Ho or Tm/Ho dopants exist, along with the pump laser. However, optical isolators, couplers, WDMs, and polarizers at this wavelength are uncommon compared to more traditional wavelengths such as 1064 nm and 1550 nm corresponding to Yb-doped and Er-doped fiber gain spectral ranges.

The method of generating pulses at 2 μm through FWM enable the use of conventional modelocked 1064 nm or 1550 nm lasers to generate, with reasonable efficiency, input signal light in the 2 μm spectral range for seeding a high power 2 μm amplifier. This source need not be highly isolated from the amplifier, since any feedback from the 2 μm amplifier into the source laser will have little if any impact and no back-propagating gain that would otherwise affect stability of upstream amplifiers (e.g., amplifiers 214 or 220) or the oscillator 10.

In one variation of the embodiment of FIG. 2, the source apparatus 202 is configured for providing input signal light in the 2 μm range (e.g., from the FWM idler light), amplifier 258 is configured for amplifying input signals in the 2 μm range, and the source 243 comprises a pump source for pumping the optical amplifier 258. For example, where the optical amplifier 258 comprises a thulium or holmium active material the source 243 can provide pump optical energy having a wavelength of about 793 nm. The source 243 can provide pump wavelengths in the 680 nm and 1550 nm spectral ranges where the optical amplifier 258 comprises thulium or in the 1900 nm spectral range where the optical amplifier 258 comprises holmium. The amplifier can 258 can comprise a single clad or DC amplifier, and the configuration of the source 243 can be varied accordingly (though in some cases the same source 243 can be used whether the amplifier 258 is single or doubled clad). For example, where the amplifier 258 comprises a single clad amplifier, the source 243 can comprise a pump source having a single mode output; where the amplifier 258 comprises a DC amplifier, the source 243 can comprise a MM source comprising, for example, MM laser diode(s), multiple diodes, or a diode bar, as is known in the art.

Accordingly, one embodiment of the disclosure provides a source of pump or input signal light for laser or amplifier optical device, such as an optical amplifier. The source of radiation has a significant portion of its energy within a single TE mode such that the power can be efficiently coupled into small waveguides and beams within fiber, bulk and planar amplifier devices. The pump or input signal light is generated through a parametric process of FWM.

FIG. 3 schematically illustrates an optical apparatus 304 according to the present disclosure including an optical amplifier and a pump source for the optical amplifier, where the optical amplifier and pump source share a common source.

The optical apparatus 304 of FIG. 3 includes features that are substantially the same as the optical apparatus of the other embodiments discussed herein, such as are discussed in conjunction with the various FIGURES, with the modifications now described. Similar reference numbers are retained for corresponding features (with the proviso that reference numbers of FIG. 3 are numbered in the 300s such that 314 corresponds to 14 of FIG. 1A, 214 of FIG. 2, 414 of FIG. 4, etc.). Corresponding or other features described elsewhere herein may be described in less detail or not all in conjunction with FIG. 3 so as to avoid undue repetition. Nevertheless, the features can also be part of the embodiment of FIG. 3, such as by being additions or substitutions, excepting combinations involving clearly mutually exclusive features.

The optical apparatus 304 of FIG. 3 can comprise source section 348, which can provide 1064 nm light, and a nonlinear section 349. The divider 319 splits the 1064 nm light from source section 348 into two different optical fiber paths. The FWM PCF of the nonlinear element 328 of the nonlinear section 349 can be designed to produce signal pulses at a wavelength of approximately 915 nm responsive to the 1064 nm light, which serves as the FWM pump light. A combiner 354, which can comprise a WDM combiner, combines the FWM signal output from the PCF with the 1064 nm FWM pump pulses in the second (lower) optical fiber path for provision to the amplifier 358, which can comprise a Yb doped optical fiber. The WDM combiner 354 injects the 1064 nm light and the FWM signal light as a pulsed input signal light and pumping light, respectively, substantially into the core of the Yb doped optical gain fiber of the amplifier 358. The FWM signal light is absorbed and used to pump the Yb amplifier to provide gain for the 1064 nm input signal light pulses. Thus the optical apparatus 304 is configured to provide a portion of the FWM pump light of the source section 348 to the amplifier 358 as input signal light for amplification and a portion of the FWM pump light of the source section 348 to the nonlinear element 349 as FWM pump light.

The output of the nonlinear section 349 can be filtered to attenuate undesired wavelengths, such as the 1064 nm light and preferably also the idler wavelength to transmit solely the FWM signal light to the WDM combiner 354 for use in pumping the amplifier 358. A suitable filter 350 is preferably included between the nonlinear section 349 and the combiner 354.

The apparatus 304 of FIG. 3 can be particularly useful where it is preferable that the amplifier 358 operates with low nonlinearity such that the pulses are not unduly spectrally broadened by SPM during amplification. This can be of particular importance, for example, where the output is to be frequency converted or where the output is used as an input seed pulse to a solid-state amplifier having a narrow gain bandwidth.

The amplifier 358 (as well as other amplifiers described herein, such as amplifiers 258, 458, 558, and 658) can comprise single-clad fiber amplifiers in which the core of the active fiber directly receives and propagates both the pumping FWM pulsed light as well as the light pulses to be amplified. However, the active fiber of the fiber amplifier can alternatively be configured as a DC fiber. The ratio of the core cross sectional area to the cross sectional area of the pump cladding should be selected to allow for acceptable absorption per unit length of the pump light. Often, though not necessarily always, when the source apparatus is pumping the amplifier, the cross sectional area of the inner cladding will typically be small compared to conventional double clad fibers pumped by multimode laser diodes. Note that, for example, where the source apparatus provides an input signal for seeding of a laser or amplifier optical device (e.g., an input signal in the 2 μm range), the amplifier may in fact comprise a DC fiber having a large diameter cladding that is pumped by MM sources, as noted above. The input signal seed light will typically be substantially confined to the core of the DC amplifier fiber and the FWM derived pump light can be coupled to the cladding for delivery to the core. The core is preferably, but not necessarily, single-moded at one or both of the pump and input seed wavelengths.

Thus in one embodiment of this invention there is provided a pulsed laser, wherein at least the final stage amplifier is pumped by light generated through a FWM process and which can include a master oscillator source that acts both as the input signal light source for a downstream amplifier as well as the pulsed pump source for the FWM process.

Figure 4:
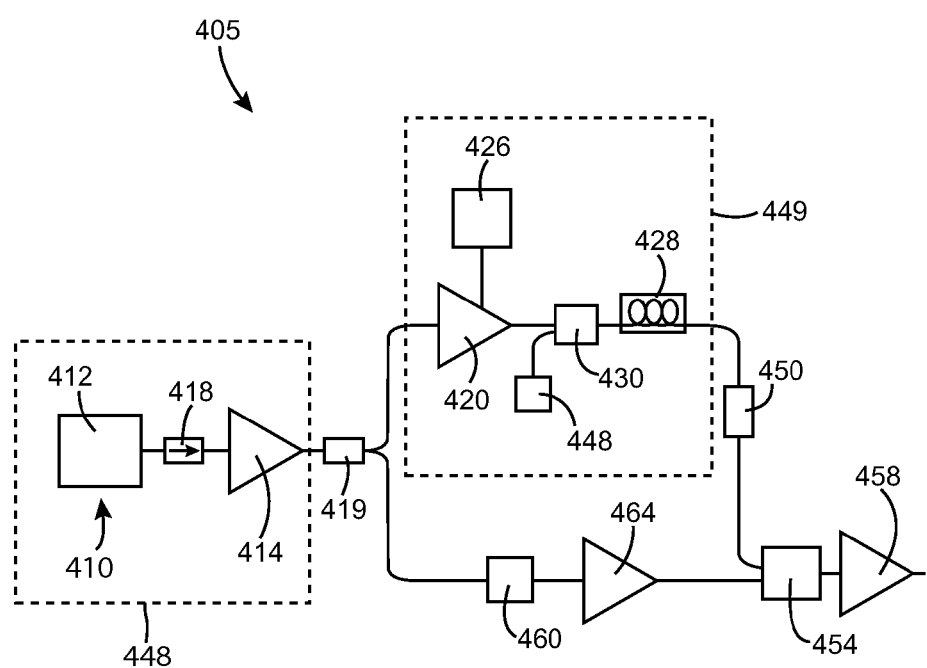
FIG. 4 schematically illustrates an optical apparatus according to the present disclosure including an optical amplifier, pump source and seed source, such as the optical apparatus of FIG. 3, and also including a modulator and/or amplifier optically interposed between the seed source and the amplifier.

FIG. 4 schematically illustrates another optical apparatus 405 according to the present disclosure. FIG. 4 includes features that are substantially the same as the optical apparatus of other embodiments, such as are discussed in conjunction with the various FIGURES, with the modifications now described. Similar reference numbers are retained for corresponding features (with the proviso that reference numbers of FIG. 4 are numbered in the 400's, such that 414 corresponds to 14 of FIG. 1A, 214 of FIG. 2, etc.). Corresponding or other features described elsewhere herein may be described in less detail or not at all in conjunction with FIG. 4 so as to avoid undue repetition. Nevertheless, the features can also be part of the embodiment of FIG. 4, such as by being additions or substitutions, excepting combinations involving clearly mutually exclusive features.

The optical apparatus 405 includes a source section 448 that provides 1064 nm light pulses and a nonlinear section 449 that includes a nonlinear element 428 hosting a FWM process, as described, for example, above in conjunction with FIG. 3. The divider 419 and filter 450 can also function as described above. The lower optical path includes a modulator 460 configured for pulse picking and/or an amplifier 464 optically interposed between the source section 448 and the amplifier 458. Modulator 460 reduces the repetition rate of pulses from the source section 448 from, for example, 40 MHz to 100 KHz. The modulator 460 can be based on a fiber coupled acousto-optic-modulator (AOM) and can be driven by electronics (not shown) so as to be synchronized to the repetition rate of the oscillator 410. The amplifier 464 can provide preamplification prior to the WDM combiner 454 combining the 1064 nm amplified light pulses in the lower optical path with the FWM signal pump pulses of the upper path The 100 KHz pulses are amplified by amplifier 458, which can comprise a single-mode Yb fiber amplifier, to at least 1 Watt of average power, or at least 10 microjoules pulse energy, with a peak power of at least 500 kW.

The apparatus 405 of FIG. 4 can be particularly useful where it is preferable that the amplifier 458 operates with low nonlinearity such that the pulses are not unduly spectrally broadened by SPM during amplification. This can be of particular importance, for example, where the output is to be frequency converted or where the output is used as an input signal seed pulse to a solid-state amplifier having a narrow gain bandwidth.

The apparatus 405 can include, instead of or in addition to the modulator 460, a pulse time duration modification device (e.g., pulse stretcher or compressor) for changing the time duration of pulses. For example, the apparatus 405 can include a pulse stretcher or compressor in place of the modulator 460, or in optical communication with the modulator 460, so that the pulses in the lower optical path, which are delivered to the amplifier 458 as input signal light, have a changed time duration as well as changed repetition rate. The pulse duration modification device can be located in a different optical path than the modulator, such that the apparatus 405 includes a pulse modification device (e.g., a stretcher or compressor) in the upper optical path. Any combination or arrangement of pulse time duration modification devices and modulators is within the scope of the disclosure. For example the apparatus 405 can include a modulator or pulse time duration modification device in the upper or lower path; a modulator in one of the paths and a time duration modification device in the other of the paths; a time duration modification device and a modulator in the same path; or even two modulators or pulse time direction modification devices, one in each of the paths.

More particularly, apparatus 304 and 405 of FIGS. 3 and 4, respectively, can include a pulse stretcher in one of the optical paths, such as downstream of the dividers 319, 419 and upstream of the amplifiers 358, 458. Furthermore, the pulse stretcher can be upstream (or downstream) of the amplifiers 320, 420 of FIGS. 3 and 4, respectively, or upstream of amplifier 464 of FIG. 4. The pulse stretcher can be used to configure the pulse durations of the pulses sourced from the source sections 348 and 448 (e.g., 1064 nm pulses) to have different pulse durations in the upper and lower paths. Adjusting the relative time duration of the light in the two paths may be of interest, for example, when the optimum pulse duration for the FWM process is different from optimum pulse duration desired from optical apparatus 304, 405 after amplification by the amplifiers 358, 458.

For clarity, it is noted that the foregoing discussion regarding changing repetition rate and/or time durations can apply to apparatus shown in FIGS. 3, 4 and 6A as well as to FIG. 5A (discussed below). Generally apparatus herein can be configured for changing the time duration or the repetition rate of signals (e.g., the input signal light or of the pump light)

whereby signals (which are typically in different optical paths, such as before being combined downstream) have one of different repetition rates or different time durations. Alternatively, one or both of the time durations can be modified. Both can be modified in the substantially the same way. For example, pulse pickers could be located in both the upper and lower optical paths and reduced both repletion rates by substantially the same amount or so as to be substantially the same.

Thus in one embodiment there can be provided an ultrafast fiber based optical apparatus delivering several micro-Joule energy level pulses, which can be used for materials processing, and where the peak power limit due to SRS in the power amplifier is reduced by the use of short length amplifier fibers with high pump absorption compared to existing state of art DC fiber amplifiers.

Figure 5A:
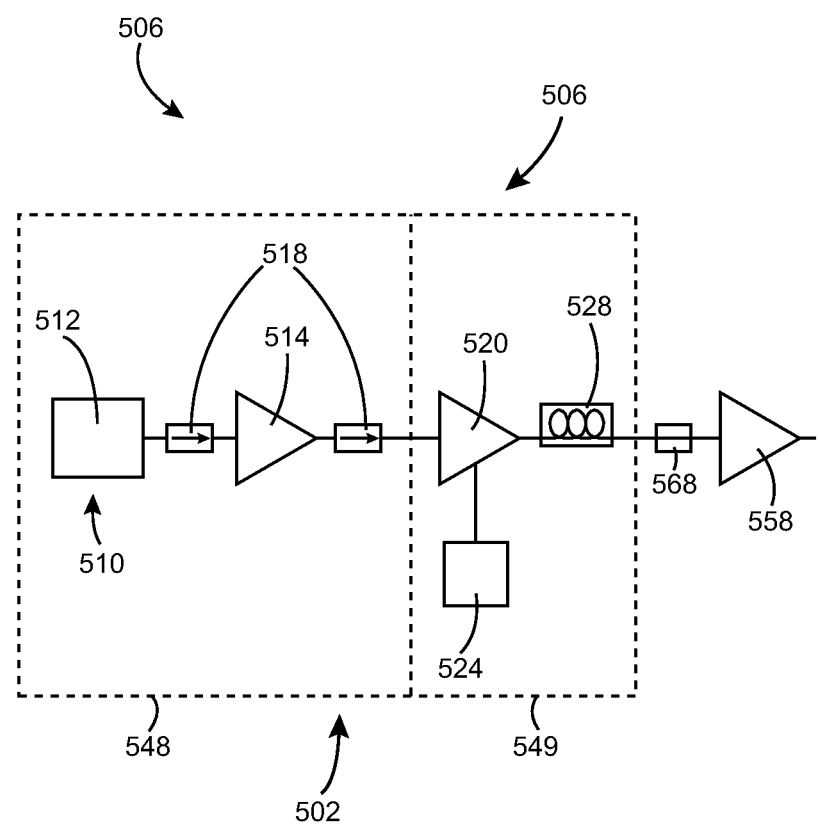
FIG. 5A schematically illustrates an optical apparatus according to the present disclosure configured for providing pump and input signal light for an amplifier.

FIG. 5A schematically illustrates an optical apparatus 506 according to the present disclosure configured for providing pump and input signal light pulses for an amplifier, where the pump energy provides the population inversion within the amplifier to amplify the input signal light. The pump and input signal light can comprise, respectively, the FWM signal and FWM idler signals generated by a FWM process of the optical apparatus.

The optical apparatus 506 of FIG. 5A includes features that are substantially the same as the optical apparatus of other embodiments, such as are discussed in conjunction with the various other FIGURES, with the modifications now described. Similar reference numbers are retained for corresponding features (with the proviso that reference numbers of FIG. 5A are numbered in the 500s, such that 514 corresponds to 14 of FIG. 1A, 214 of FIG. 2, etc.). Corresponding or other features described elsewhere herein may be described in less detail or not all in conjunction with FIG. 5A so as to avoid undue repetition. Nevertheless, the features can also be part of the embodiment of FIG. 5A, such as by being additions or substitutions, excepting combinations involving clearly mutually exclusive features.

Optical apparatus 506 can include optical source 502, which can comprise the source 202 of FIG. 2 with certain modifications to the source and nonlinear sections. The source section 548 can comprise an oscillator 510 that can include an Yb doped fiber laser oscillator 512 operable to deliver 1030 nm pulses at a repetition rate of 80 MHz and with pulse duration of 20 picoseconds. A two stage double-clad amplifier comprising individual amplifiers 514 of the source section 548 and amplifier 520 of the nonlinear section 549, provides an amplified 1030 nm pulse train having a repetition rate of 80 MHz and with nominally 20 picoseconds pulse duration and more than 30 watts average output power, corresponding to a peak pulse power of approximately 20 kW.

The nonlinear element 528 comprises a FWM element comprising a microstructured fiber configured to generate, through FWM, signal light at approximately 687 nm and idler light at approximately 2060 nm, and the nonlinear section 549 outputs a pulse train comprising signal, idler, and un-depleted pump light at 1030 nm, with approximately 25% conversion (7.5 Watts) to the 687 nm signal and more than 500 mW at the 2060 nm idler wavelength.

The apparatus 506 can include a filter 568 which is designed to pass both the signal and idler wavelengths and attenuate the 1030 nm pump light. The amplifier 558 can comprise a holmium-doped fiber amplifier that uses the 687 nm pulsed pump light (i.e., the signal light of the FWM process) to pump the amplifier to amplify the pulses of 2060 nm input signal light (the idler light of the FWM process) to several watts average power. The holmium doped fiber amplifier (as with any amplifier disclosed herein, or more generally, any laser or amplifier optical device) can be single clad and/or have a single mode, few moded, or MM core, or can be double clad with a single mode, few moded, or MM core, and can be substantially core pumped or cladding pumped (as can any of the amplifiers 258, 358, 458, 558, 658, and 758 disclosed herein). "Few moded", as used herein, means 15 or less transverse modes at the operating wavelength (i.e., the wavelength of the light that is being amplified, in this case the input signal light wavelength.)

Figure 5B:
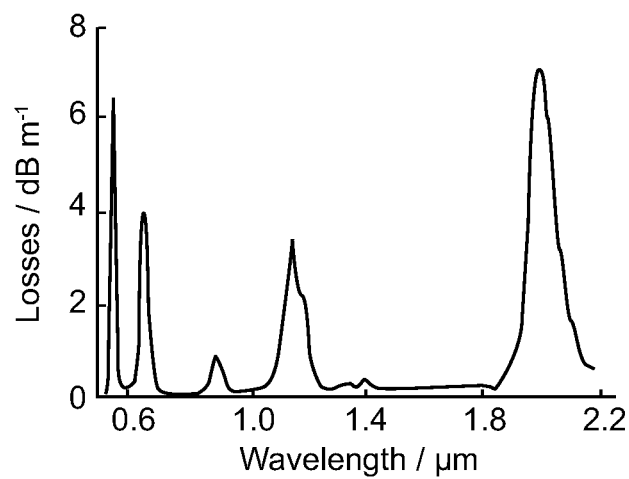
FIG. 5B illustrates an example of an absorption spectrum curve for one example of an optical fiber doped with holmium.
Figure 5C:
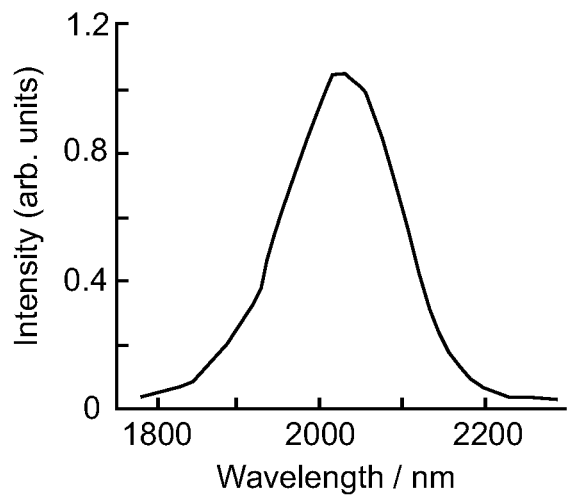
FIG. 5C illustrates an example of a luminescence spectrum curve for holmium ions in silica glass.

FIGS. 5B and 5C show, respectively, an example of an absorption spectrum curve for an optical fiber doped with holmium and an example of a luminescence (emission) spectrum curve for holmium ions in silica glass. Note that the 687 nm signal light generated by the FWM process falls substantially at the second absorption peak from the left of FIG. 5B and the 2060 nm is well positioned near the peak of the luminescence curve of FIG. 5C. As appreciated by the skilled worker, the absorption and emission spectra for a RED material arranged in a device allow for pumping and gain wavelengths, wherein a pumping wavelength comprises a wavelength at which the device can be pumped and the pump absorbed so as to provide optical gain at a different wavelength. Similarly, a gain wavelength comprises a wavelength wherein the device with the RED material can provide optical gain responsive to receiving and absorbing pump light having a different wavelength.

Note that there is reduced (or no) need for optical isolation between the 1030 nm final amplifier 520 and the Ho-doped final stage amplifier 558 since the FWM process provides wavelength discrimination between the two systems, thus removing the need for expensive 2 μm, high power isolator components that would otherwise be required in an all Ho-doped master oscillator power amplifier (MOPA).

In one practice, the present disclosure teaches an optical apparatus, which can be configured as an all-fiber MOPA system, in which both the input signal and pump light for the power amplifier are generated through a single FWM process, such FWM process being designed to provide signal and idler wavelengths to provide corresponding gain and pumping wavelengths, respectively, for a downstream gain medium. Although FIG. 5A shows the holmium amplifier 558, also contemplated within the present disclosure is a stand alone pump source, such as the optical apparatus of FIG. 5A absent the pumped and input seeded amplifier 558 (see also the optical apparatus of FIG. 1A), which can be configured following the teachings herein to provide both pumping light for a downstream laser or amplifier optical device as well as a input signal light for the downstream laser or amplifier optical device. A stand alone source can include the filter 568.

Though not shown in FIG. 5A, the optical apparatus 506 can be configured for changing the time duration or repetition rate of one or both of the input signal and pumping light such that the input signal light and pump light have one or both of a different time duration or a different repetition rate. For example, light from the nonlinear section 549 can be split into two optical paths by a WDM upstream of the optical amplifier 558 and the techniques described above in the discussion of FIG. 4 employed.

FIG. 5A illustrates that input signal and pumping light for a laser or amplifier optical device (e.g., in the example of FIG. 5 an amplifier) can be derived from the signal and idler of the same FWM process. However, more generally input signal and pumping light can be derived from different non-linear processes (including different type of processes). For example, the input signal and pumping light can be derived from two different FWM processes, such as the input signal light being derived from the signal wavelength of one process and the pump light being derived from the signal wavelength of another FWM process.

Figure 6A:
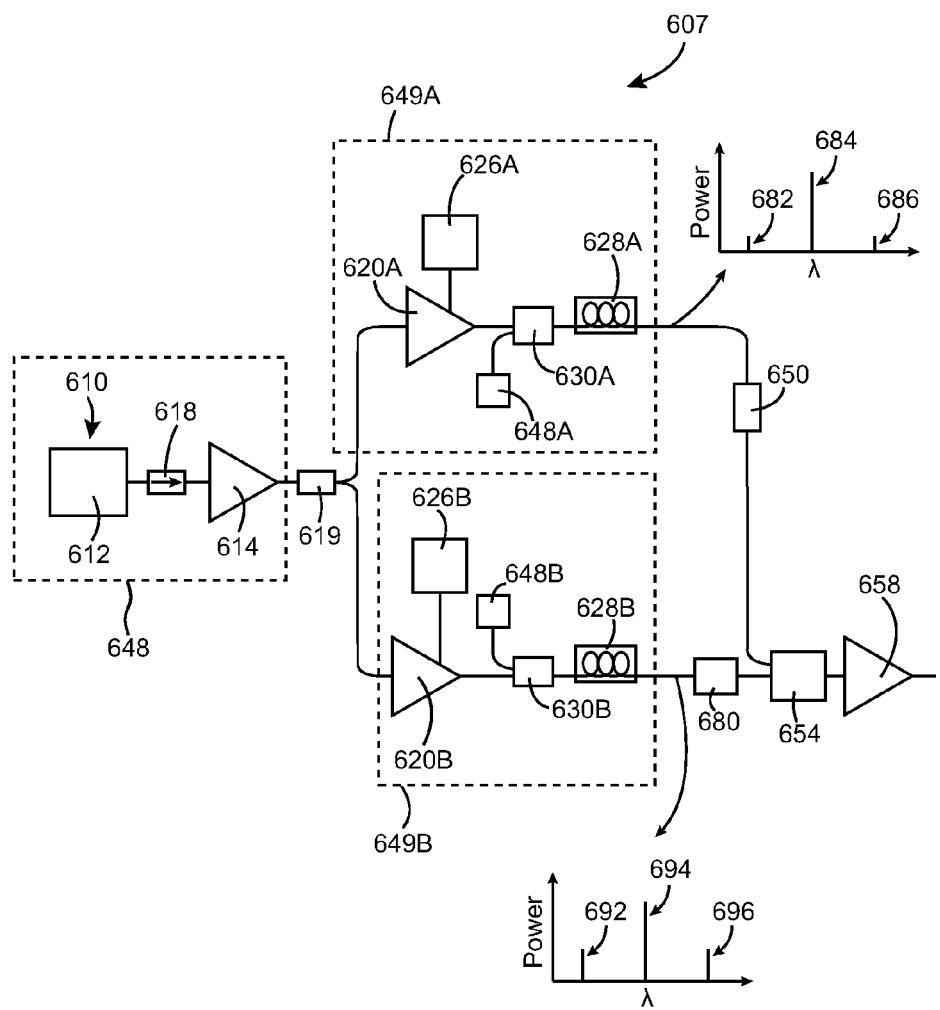
FIG. 6A schematically illustrates another example of an optical apparatus according to the present disclosure configured for providing pump light and input signal light for an amplifier.

FIG. 6A schematically illustrates another example of an optical apparatus 607 according to the present disclosure configured for providing pump and seed pulses for an amplifier. The optical apparatus 607 of FIG. 6A includes features that are substantially the same as the optical apparatus of other embodiments, such as are discussed in conjunction with the various other FIGURES, with the modifications now described. Similar reference numbers are retained for corresponding features (with the proviso that reference numbers of FIG. 6A are numbered in the 600s, such that 614 corresponds to 14 of FIG. 1A, 214 of FIG. 2, etc.). Corresponding or other features described elsewhere herein may be described in less detail or not all in conjunction with FIG. 6A so as to avoid undue repetition. Nevertheless, the features can also be part of the embodiment of FIG. 6A, such by being additions or substitutions, excepting combinations involving clearly mutually exclusive features.

The optical apparatus 607 includes a source section 648 whose output is divided by divider 619 into two nonlinear sections 649A and 649B, one of which generates input signal light to be amplified by the amplifier 658 and the other of which generates pump energy for pumping the amplifier 658 with pump light pulses so as to amplify the input signal light. Combiner 654 combines the upper and lower optical paths to provide the input signal light and pump light to the amplifier 658.

Source section 648 can produce 1064 nm pulses. Nonlinear section 649A can include a PCF as nonlinear element 628A that produces the FWM signal and idler pulses at 793 nm and 1616 nm, respectively, responsive to being pumped at 1064 nm, as indicated in the upper inset in FIG. 6A, in which signal, pump and idler wavelengths are represented by reference numbers 682, 684 and 686, respectively. The seed diode 648A of nonlinear section 649A can seed the FWM process at 793 nm. Nonlinear section 649B can include a PCF as nonlinear element 628B that produces FWM signal and idler pulses at 739 nm and 1900 nm, respectively, responsive to being pumped at 1064 nm, as indicated in the lower inset in FIG. 6A, in which signal, pump and idler wavelengths are represented by reference numbers 692, 694 and 696, respectively. The seed diode 648B of nonlinear section 649B can seed the FWM process of nonlinear source 649B at 739 nm. The amplifier 658 can comprise a thulium doped silica fiber as the gain fiber that receives from the combiner 654 the 793 nm signal wavelength of the nonlinear section 649A as pump light and the 1900 nm idler wavelength of the nonlinear section 649B as input signal light to be amplified responsive to the pump light. The amplifier 658 thus outputs amplified 1900 nm light. The fiber amplifier 658 can comprise a gain fiber, which can comprise a RED material as the active material. The gain fiber can be single clad and/or have a single mode, few moded, or MM core, or can be double clad with a single mode, few moded, or MM core. The gain fiber can be substantially core pumped with the pump light.

The optional filters 650 and 680 can filter undesired wavelengths. For example, the filter 650 can remove the pump light pulses at 1064 nm 684 but equally it could remove also one or other of the signal and idler wavelengths or, alternatively, not be included so as to allow all wavelengths to be utilized. In another example, the filter 680 can filter the signal wavelength 692 at 739 nm and pump light 694 at 1064 nm and transmit the idler pulses 696 at 1900 nm, but could pass one of the signal and pump wavelengths with the idler wavelength or can be foregone such that all wavelengths pass.

Figure 6B:
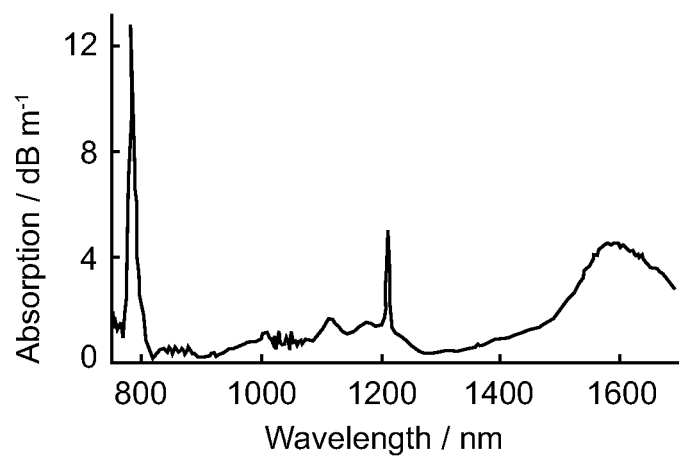
FIGS. 6B and 6C schematically illustrate, respectively, absorption and luminescence spectrum curves for one example of an optical fiber doped with thulium.
Figure 6C:
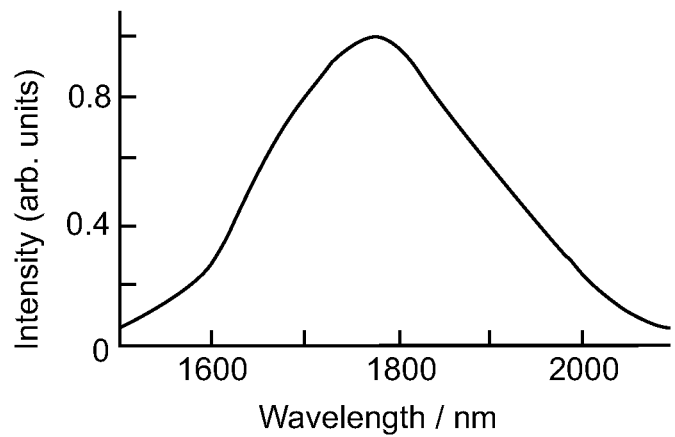

FIGS. 6B and 6C show, respectively, examples absorption and luminescence spectrum curves for an optical fiber doped with thulium. Note that the 793 nm signal light generated by the first FWM process falls substantially at the first absorption maxima from the left of FIG. 6B and that the 1900 nm idler light of the second FWM process is well positioned near the peak of the luminescence curve of FIG. 6C, indicating that signal light of the first FWM process and the idler light of the second FWM process are of suitable wavelengths to serve as pump and input seed light, respectively, of the thulium doped fiber amplifier.

Thus in one practice the disclosure teaches providing a source of high power laser light wherein a laser system can employ more than one FWM processes to generate input signal and pumping light for seeding and pumping a laser or amplifier optical device, such as the amplifier described above. The input signal/seed wavelength can correspond to the idler wavelength of one of the FWM processes and the pump wavelength can correspond to the signal light wavelength of the other FWM process, though any other combinations of signal and idler from the two FWM processes are within the disclosure. Input signal and pump light can be derived from two idler wavelengths, two signal wavelengths, or an idler and a signal wavelength.

Note that the absorption curves shown in FIG. 1B (Yb), FIG. 5B (Ho) and FIG. 6B (Tm), each have various maxima (local and absolute). For example, the Yb spectrum of FIG. 1B shows an absolute maxima substantially at 980 nm and a local maxima substantially at 915 nm. Typically, pump diodes are available having limited output wavelengths, which are selected to correspond to a maxima. However, according to the present disclosure, a FWM element can be configured for providing pump light at any pumping wavelength, such that a gain material need not be optically pumped substantially at a maxima. Pumping at a wavelength other than a wavelength that substantially corresponds to a maxima of the absorption spectrum of the RED material can have advantages in, for example, avoiding photodarkening. For example, in accordance with the methods and apparatus disclosed herein, an RED material comprising Yb can be pumped at a pumping wavelength of 880 nm, instead of the typical wavelength of 976 nm with pump light produced by a diode pump source. A RED material can be pumped at multiple pumping wavelengths, such as, for example, one corresponding to the idler and signal of the same FWM process, or an idler and a signal of different FWM processes, or idlers of different FWM processes or signals of different FWM processes.

The present disclosure is directed to each individual feature, system, material, and/or method described herein. In addition, any combination of two or more such features, systems, materials, and/or methods, if such features, systems, materials, and/or methods are not mutually inconsistent, is included within the scope of the present invention. To avoid undue repetition, not all features are discussed in conjunction with every aspect, embodiment, or practice of the disclosure. Features described in conjunction with one aspect, embodiment, or practice are deemed to be includable with others absent mutual inconsistency or a clear teaching to the contrary. In some instances, features will be discussed generally rather than in detail in conjunction with a specific aspect, embodiment, or practice, and it is understood that such features can be included in any aspect, embodiment, or practice, again absent mutual inconsistency or a clear teaching to the contrary.

For example, In various practices of the disclosure an optical apparatus described herein, such as apparatus 2, 203, 304, 405, 506, 607 and 708, can be configured to provide pulses having a time duration of no greater than 500 ns; no greater than 100 ns; no greater than a picoseconds time duration (defined herein as 1 ns or less); no greater than 200 ps; or no greater than 100 ps. In combination with any of the foregoing, the pulses can be no shorter than, for example, 1 ps or 500 fs. In other practices, the pulse can be no less than 500 fs and no greater than 100 or 200 ps. It will be appreciated that the examples provided in this application relate to laser or amplifier optical devices, such as pulsed fiber lasers, and also including Q-switched lasers, gain switched lasers, and other types of laser and amplifier systems, including those based on a MOPA architecture.

Those of ordinary skill in the art will readily envision a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used.

Those skilled in the art will recognize or be able to ascertain using no more than routine experimentation, many equivalents to the specific embodiments of the invention described herein. It is therefore to be understood that the foregoing embodiments are presented by way of example only and that within the scope of the appended claims, and equivalents thereto, the invention may be practiced otherwise than as specifically described.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 8$^{th}$ Edition, Revision 8. Furthermore, statements in the specification, such as, for example, definitions, are understood to be open ended unless otherwise explicitly limited.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time). "At least one of A, B or C" (as well as "at least one of A, B and C") reads on any combination of one or more of A, B and C, including, for example the following: A; B; C; A & B; A & C; B & C; A & B; as well as on A, B & C.

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one widget" and subsequent recitation that "said at least one widget is colored red" does not mean that the claim requires all widgets of an apparatus that has more than one widget to be red. The claim shall read on an apparatus having one or more widgets provided simply that at least one of the widgets is colored red. Similarly, the recitation that "each of a plurality" of widgets is colored red shall also not mean that all widgets of an apparatus that has more than two red widgets must be red; plurality means two or more and the limitation reads on two or more widgets being red, regardless of whether a third is included that is not red, absent more limiting explicit language (e.g., a recitation to the effect that each and every widget of a plurality of widgets is red).

What is claimed is:

1. Optical apparatus, comprising,
an optical source for providing output light for providing input signal light, comprising:
  a pump source for pumping a four wave mixing (FWM) process with light pulses ("FWM pump light");
  a FWM element in optical communication with said pump source, said FWM element configured for hosting the FWM process to generate, responsive to the FWM pump light, pulses of FWM signal light and FWM idler light having different wavelengths; and
  said FWM element comprising a microstructured optical fiber comprising longitudinally extending features that promote guidance in the core of the microstructured optical fiber; and
a laser or amplifier optical device comprising a gain material for providing optical gain at a gain wavelength via a process of stimulated emission responsive to optical pumping with pump light, said laser or amplifier optical device in optical communication with said optical source and receiving one of the FWM signal light and the FWM idler light as input signal light having the gain wavelength for optically seeding with input signal light the laser or amplifier optical device.

2. The optical apparatus of claim 1 wherein said gain material comprises a rare earth doped (RED) material.

3. The optical apparatus of claim 1 wherein said laser or amplifier optical device comprises an optical fiber, said optical fiber comprising said gain material.

4. The optical apparatus of claim 2 wherein said gain material comprises ytterbium and further comprises an ytterbium absorption spectrum.

5. The optical apparatus of claim 2 wherein said pump source comprises a selected RED material that comprises a rare earth comprised by the RED material.

6. The optical apparatus of claim 2 wherein the RED material comprises one or more of holmium, neodymium, erbium, ytterbium or thulium.

7. The optical apparatus of claim 1 wherein said one of the FWM signal light and FWM idler light is substantially single mode and has an average power of at least 2 Watts.

8. The optical apparatus of claim 1 wherein said laser or amplifier optical device receives pump light from a source other than the FWM signal light and other than the FWM idler light.

9. The optical apparatus of claim 1 wherein said optical apparatus comprises a pulse picker for reducing the repetition rate of the input signal light prior to the delivery thereof to the laser or amplifier optical device.

10. The optical apparatus of claim 1 wherein the laser or amplifier optical device comprises an optical amplifier receiving said one of the FWM signal light and FWM idler light for being optically seeded with input signal light, said optical amplifier comprising an optical fiber comprising the gain material for providing the optical gain.

11. The optical apparatus of claim 10 wherein said optical amplifier produces substantially single mode pulses comprising a temporal pulse width of no greater than 100 ps, a pulse energy of at least 50 microjoules and a wavelength of in the range of 900 nanometers to 2500 nanometers.

12. The optical apparatus of claim 10 wherein said optical amplifier produces substantially single mode pulses comprising a peak power of at least 200 Kilowatts and wherein the length of said optical fiber along which said fiber includes said gain material is no greater than 1 meter.

13. The optical apparatus of claim 10 wherein said optical amplifier receives the other of the FWM signal light and FWM idler light as substantially single mode pump light, said optical apparatus configured such that said optical fiber absorbs the substantially single mode pump light along at least part of its length at the rate of at least 5 dB per meter.

14. The optical apparatus of claim 10 wherein said optical amplifier receives the other of the FWM signal light and FWM idler light as pump light, said optical fiber being substantially core pumped with said pump light.

15. The optical apparatus of claim 10 wherein said optical amplifier receives the other of the FWM signal light and FWM idler light as pump light, and wherein said optical apparatus is configured such that said optical fiber absorbs at least 10 dB of said pump light over a length of no greater than 50 cm.

16. The optical apparatus of claim 1 comprising a second FWM element, said second FWM element configured for hosting a second FWM process generating second FWM signal light and second FWM idler light, said laser or amplifier optical device receiving one of said second FWM signal light and second FWM idler light as pump light for optically pumping the laser or amplifier optical device.

17. The optical apparatus of claim 1 wherein said optical apparatus provides output pulses having a time duration of 1 ns or less.

18. The optical apparatus of claim 1 wherein said optical apparatus provides output pulses having a time duration of 200 ps or less.

19. A method of seeding with input light a laser or amplifier device comprising a gain material for providing optical gain at a gain wavelength via a process of stimulated emission responsive to optical pumping with pump light, comprising:
  Generating, using a nonlinear element hosting a four wave mixing (FWM) process, at least one of FWM signal light and FWM idler light, the nonlinear element comprising a microstructured optical fiber comprising longitudinally extending features that promote guidance in the core of the microstructured optical fiber; and
  seeding the laser or amplifier optical device with one of the FWM signal light pulses and the FWM idler light pulses as input signal light having the gain wavelength of the gain material.

20. The method of claim 19 wherein the gain material comprises a rare earth doped (RED) material comprising ytterbium for providing the optical gain, said gain material further comprising an ytterbium absorption spectrum.

21. Optical apparatus, comprising,
  an optical source configured for providing output light for providing input signal light or pump light, comprising:
    a pump source for pumping a four wave mixing (FWM) process with light pulses ("FWM pump light");
    a FWM element in optical communication with said pump source, said FWM element configured for hosting the FWM process to generate, responsive to the FWM pump light, pulses of FWM signal light and FWM idler light having different wavelengths; and
    said FWM element comprising a microstructured optical fiber comprising longitudinally extending features that promote guidance in the core of the microstructured optical fiber; and
  wherein said optical source is configured such that the output light comprises one of the FWM signal light or the FWM idler light as input signal light having a gain wavelength for seeding with input signal light a laser or amplifier optical device comprising a gain material for providing optical gain, where the gain material has absorption and emission spectra defining gain and pumping wavelengths at which, respectively, the gain material is arranged in the device to provide optical gain via a process of stimulated emission responsive to being pumped.

22. The optical apparatus of claim 21 wherein said gain material comprises a rare earth doped material (RED) for providing the optical gain.

23. The optical apparatus of claim 21 wherein said gain material comprises ytterbium and further comprises an ytterbium absorption spectrum.

24. The optical apparatus of claim 21 wherein said optical source comprises an output optical fiber for delivering the output light, said output optical fiber comprising a multimode core having a cross sectional area selected to substantially match the cross sectional area of the pump cladding of a cladding pumped (double clad) optical fiber.

25. The optical apparatus of claim 21 wherein said optical source comprises an output optical fiber for delivering the output light, said output optical fiber comprising a multimode core having a diameter of at least 50 microns.

26. The optical apparatus of claim 22 wherein said pump source comprises a selected RED material that comprises a rare earth comprised by the RED material.

* * * * *